United States Patent [19]

Lee

[11] 4,438,233
[45] * Mar. 20, 1984

[54] FAST CRYSTALLIZING POLYALKYLENETEREPHTHALATE RESIN COMPOSITIONS

[75] Inventor: Chung J. Lee, Sheboygan, Wis.

[73] Assignee: Plastics Engineering Company, Sheboygan, Wis.

[*] Notice: The portion of the term of this patent subsequent to Dec. 21, 1999 has been disclaimed.

[21] Appl. No.: 420,570

[22] Filed: Sep. 20, 1982

[51] Int. Cl.$^3$ ............................................. C08L 67/02
[52] U.S. Cl. ...................... 524/299; 524/315; 524/318; 524/368; 524/424; 524/442; 524/449; 524/539; 525/166; 525/408; 525/425; 525/437; 525/444
[58] Field of Search ............... 525/425, 166, 437, 408, 525/444; 524/299, 315, 318, 366, 424, 449, 442, 368, 539

[56] References Cited

U.S. PATENT DOCUMENTS

| | | | |
|---|---|---|---|
| 3,458,462 | 7/1969 | Hostetler | 524/275 |
| 3,761,450 | 9/1973 | Herwig | 528/307 |
| 4,322,335 | 3/1982 | Nield | 523/522 |
| 4,351,758 | 9/1982 | Lu | 524/227 |
| 4,362,839 | 12/1982 | Tonoki | 524/513 |
| 4,365,036 | 12/1982 | Lee | 524/299 |

OTHER PUBLICATIONS

Lee, C. C., Polymer, vol. 19, pp. 234–235, 1978.

Primary Examiner—John C. Bleutge
Assistant Examiner—Patricia Short
Attorney, Agent, or Firm—Walter J. Monacelli

[57] ABSTRACT

The fast crystallizing polyalkyleneterephthalate resin compositions disclosed herein contain 0.05–4 percent by weight of lithium bromide, chloride or iodide in the form of a selected complex of the lithium halide (LiX) and an organic compound, such as a polymeric compound, which contains at least two recurring units of the formula —CH$_2$CH$_2$O— together with reinforcing agents, fillers and/or additives and optionally a flow promoter selected from low molecular weight organic esters or block copolymers containing a recurring structure of [(CH$_2$)$_x$O—]$_m$ wherein x is an integer of no more than 5 and m is an integer ranging from 2, preferably from 200 to about 5,000. The amount of complex is such as to give 0.05 to 4 percent, preferably 0.1–2 percent by weight of LiX based on the weight of polyalkyleneterephthalate.

16 Claims, No Drawings

FAST CRYSTALLIZING POLYALKYLENETEREPHTHALATE RESIN COMPOSITIONS

BACKGROUND OF THE INVENTION

1. Field of the Invention

The invention relates to the making of fast crystallizing polyalkyleneterephthalate resin compositions useful in molding applications. More particularly, this invention relates to the preparation of fast crystallizing polyalkyleneterephthalate molding compounds containing a complex of lithium halide (LiX) and an organic compound, such as a polymeric compound, containing an ethyleneoxy repeating unit together with appropriate reinforcing agents, fillers and/or additives.

2. State of the Prior Art

Polyalkyleneterephthalates have acquired considerable attention as starting materials for the preparation of film, fiber and shaped articles due to their outstanding mechanical and thermal properties. However, polyethyleneterephthalate is known to have a very slow crystallization rate at temperatures below 130° C. so that when low molding temperatures and short residence times are employed the molded article has low crystallinity and poor surface smoothness. The resultant necessity to use high mold temperatures and long residence times has, for a long time, discouraged the use of polyethyleneterephthalates as a molding resin despite its high mechanical and thermal properties.

Polypropyleneterephthalate and polybutyleneterephthalate both have fast crystallization rates, but their crystallization rates and degree of crystallinity still need to be improved, especially for molding very thin parts at low temperatures.

The effectiveness of a crystallization promoter can be studied by measuring the melt and cold crystallization rates of the polyalkyleneterephthalate resin compositions. A much more convenient way is to measure the melt and cold crystallization temperatures of the compositions. Conventionally, the melt crystallization temperature can be determined by following the heat capacity change of the melt in a calorimeter. The maximum of the exotherm during the slow cooling of the melt is taken as the melt crystallization temperature (Tmc). The maximum of the exotherm during a more rapid heating of an amorphous polyalkyleneterephthalate is taken as the cold crystallizing temperature (Tcc). To obtain the amorphous or glassy polyalkyleneterephthalate, the resin has first to be completely melted and then quickly quenched, for instance by dropping the melt into dry ice. It should be noted that both the obtained melt and cold crystallization temperatures depend not only on the history (melt temperatures, annealing, etc.) of the specimen, but also on the heating and cooling rate of the measurement. Thus, for studying the effectiveness of a crystallization promoter, these conditions have to be fixed for purposes of direct comparison. These temperatures are obtainable using a differential scanning calorimeter.

Due to the low heat conductivity of the polymer molding compounds, the inside portion of the resin usually experiences during molding a slower cooling rate than the surface of the molded article. The study of the melt crystallization thus can provide information relating to inside portions whereas the study of the cold crystallization can provide information relating to the surface of the molded article. A desirable crystallization promoter will substantially increase the melt crystallization temperature and decrease the cold crystallization temperature of polyalkyleneterephthalate resin compositions.

In 1968, the British Pat. No. 1,104,089 proposed the use of a finely divided inorganic solid, such as talc, as a crystallization promoter for polyethyleneterephthalate molding compounds. For purposes of comparison and study, the crystallization promoter described herein is tested against talc.

SUMMARY OF THE INVENTION

In accordance with the present invention, a polyalkyleneterephthalate molding composition having the promoter described herein has a considerable increase in its melt crystallization temperature and decrease in its cold crystallization temperature as compared with a corresponding composition containing none of the promoter. Thus by the addition of an effective amount of the crystallization promoter which is a complex of LiX (X is Br, Cl or I) and a polymeric compound having the formula $[CH_2CH_2O—]_n$, wherein the n is an integer of at least 2, the crystallization rate of the polyalkyleneterephthalate resin compositions can be improved substantially, thus permitting the use of low mold temperatures and short residence times while still providing a shaped article having high crystallinity and a glossy surface. The proportion of LiX complex is such as to give 0.05-4 percent, preferably 0.1-2 percent by weight of LiX based on the weight of polyalkyleneterephthalate.

The matrix resin polyalkyleneterephthalate employed herein has the following formula:

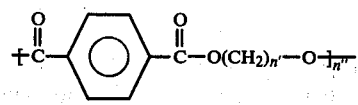

wherein n' is an integer having a value of 2, 3, or 4 and n" is an integer having a value of 50-160 or more, preferably 80-120. This resin can be prepared in a conventional process by esterifying or transesterifying terephthalic acid and/or the corresponding dialkylterephthalate, preferably the dimethyl ester, with about 1.05 to 5.0 moles of alkylene glycol, preferably from 1.4 to 3.0 moles per mole of dicarboxylic acid component in the presence of an esterification and/or a transesterification catalyst. The resulting reaction products are condensated in the presence of a condensation catalyst under reduced pressure (1 torr.), at temperatures of 200° to 320° C. Suitable catalysts for these reactions have been described by R. E. Wilfong in *Journal Polym. Sci.*, 54, 385 (1961). Catalysts for transesterification include Ca, Zn and Mn acetates. Catalysts suitable for condensation include antimony trioxide and triacetate and germanium dioxide. These catalysts are used in quantities from about 0.001 to 0.2% by weight, based on the weight of the dicarboxylic acid.

The preferred polyalkyleneterephthalate employed in this invention is polyethyleneterephthalate hwving an intrinsic viscosity of at least 0.4 dl/g but no more than 1.2 dl/g. The intrinsic viscosity is measured on a solution mixture of phenol and tetrachloroethane in a ⅔ weight ratio respectively. at 25° C. It is also permissible for the polyethyleneterephthalate to contain minor amounts (about 5 mole %) of other comonomers such as diethylene glycol or isophthalic acid, etc. substituted for the ethylene glycol or terephthalic acid respectively. However large amounts of a comonomer normally will depress the melting temperature and crystallization rate of the polyethyleneterephthalate and therefore excesses of such comonomers are best avoided.

In practicing this invention it is sometimes desirable to formulate the matrix resin as a block copolymer which contains a considerable amount of the same recurring structural units as in polyethyleneterephthalate or a polymer blend containing polyethyleneterephthalate for the contribution of desired mechanical and thermal properties of the block copolymer or the polyblend. This may be particularly appropriate where crystallization of the polyethyleneterephthalate is an important factor. In some applications and molding operations, where extremely thin parts and fast molding cycles are employed in conjunction with the use of very low mold temperatures (35° C. or lower), the polybutyleneterephthalate may be a better choice as the matrix resin.

A preferred polybutyleneterephthalate has an intrinsic viscosity of from 0.4 to 2.0 dl/g, preferably from 0.7 to 1.3 dl/g, as measured on an o-chloro-phenol solution of the material at 25° C. It is also suitable that the polybutyleneterephthalate contains minor amounts of a comonomer, that is by replacing a small portion of the butylene by ethylene or propylene and/or replacing a small portion of the terephthalate with isophthalate. Moreover, it is also suitable to use a polymer blend comprising as a major ingredient a polymer or a block copolymer having the recurring units of the formula:

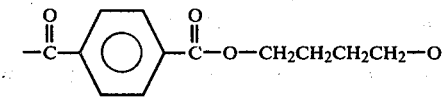

Association of polymers with inorganic compounds has been reported as early as 1951 for polyethylene oxide with calcium chloride (see, e.g., T. M. Dorscher, et al, J. Colloid Sci., 6, 223 (1951). For the last 30 years, various polymer-salt associations have been reported in the literature. These include complex formations of polyether with some alkali metal halides and transitional metal chlorides, lithium perchlorate, ammonium thiocyanate and zinc and mercuric chlorides (see C. Lee et al, Polymer, 19, 234 1978); R. Iwamoto et al, J. Polym. Sci., A-2, 6, 1509, 1968 and references therein).

These polymer-salt complexes can be prepared by evaporation of solvent from a polymer-salt solution, or by intimate mixing of salt in a polymer melt. Complexes of polymers with salts have been reported to increase the solution viscosity and glass transition temperature, to change the melt temperature and to increase the solubility of the polymer (i.e., salting-in phenomenon) in a solution containing the salt. However, no reports have been found that these polymer-salt complexes can favorably affect the crystallization rate of polyalkyleneterephthalate resins or of any other polymers. It is quite surprising therefore to observe the enormous improvements effected by this invention.

In the present invention the crystallization promoter is LiX and a polymer having the formula [$CH_2CH_2O$—]$_n$ wherein X is Br, Cl or I and the n is an integer having a value of at least 2 and up to as high as 36,000, advantageously 70–1600 or more, preferably 70–600. Regardless of the ratio of LiX to the polyethyleneoxide derivative, there should be at least 0.05 percent by weight of per unit weight of polyalkyleneterephthalate. Generally there is little or no advantage in exceeding 4 percent by weight of LiX. A preferred range is 0.1–2 percent by weight of LiX.

The organic compounds having a recurring structural unit of —$CH_2CH_2O$— include a cyclic compound such as the crown ether:

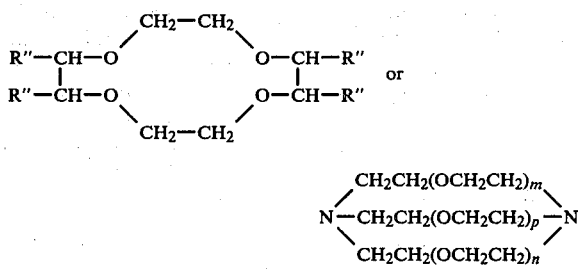

wherein each R" can be individually hydrogen, a hydrocarbylradical or a derivative thereof, and m, n and p are each individually an integer of at least 1, preferably 2–20. Suitable derivatives of polyethyleneoxides include an ester end-capped polyether of the formula R—[$CH_2CH_2O$]$_{\overline{n}}$ C(O)R' wherein R is hydrogen, a monovalent hydrocarbyl radical, including derivatives thereof, —OOCR", —C(O)NR"$_2$—OR" or a multivalent hydrocarboxyl radical; R' is hydrogen, a hydrocarbyl radical or derivative thereof, —OR" or —NR$_2$" radical. R, R' and R" each may have 1–20 carbon atoms, preferably 1–10 carbon atoms.

Typical monovalent R, R' and R" groups suitable in the above formulas include:
—$CH_3$, —$C_2H_5$, —$C_3H_7$, —$C_4H_9$, —$C_6H_{13}$, —$C_{10}H_{21}$, —$C_{18}H_{37}$, —$C_6H_{11}$, —$C_5H_{10}$, —$C_5H_8CH_3$, —$C_6H_{10}C_2H_5$, —$CH_2C_6H_{11}$, —$CH_2CH_2C_6H_{11}$, —$C_6H_5$, —$C_6H_4CH_3$, —$C_6H_4C_3H_7$, —$C_6H_3(CH_3)_2$, —$C_6H_5OCH_3$, —$C_6H_4OC_2H_5$, —$C_6H_4SCH_3$, —$C_6H_4OOCCH_3$, —$C_6H_4SO_2C_6H_4CH_3$, —$C_6H_4SO_2C_6H_5$, —$C_6H_3(CH_3)OC_3H_7$, —$C_6H_4OC_6H_4CH_3$, —$C_{10}H_8$, —$C_{10}H_7CH_3$, —$C_{10}H_7C_2H_5$, —$C_{10}H_6(CH_3)_2$, —$C_{10}H_6OCH_3$, —$C_{10}H_6OOCCH_3$, —$(C_6H_4)_3C_3H_7$, —$(C_6H_4)_3OC_4H_9$, —$(C_6H_4)_3OC_6H_5$, —$C_6H_4(OCH_2CH_2)_2H$, —$C_6H_4(OCH_2CH_2)_3H$, —$(C_6H_4O)_3C_3H_7$, —$CH_2CH_2OCH_2CH_2)_2H$, —$CH_2CH_2(OCH_2CH_2)_3OOCCH_3$, —$CH_2CH_2OC_6H_5$, —$CH_2CH_2OOCCH_3$, —$CH_2CH(CH_3)OOCC_6H_5$, —$C_6H_4COOC_2H_5$, —$CH_2COOC_6H_5$, —$C_6H_4CH=CH_2$, —$C_6H_3(CH_3)CH=CH_2$, —$C_6H_4C(CH_3)=CH_2$, —$C_6H_4=CH$, etc.

Typical multivalent R groups include —$CH_2CH_2$—, —$CH(CH_3)CH_2$—,

—$CH_2CHCH_2$—, —$CH_2CHCH_2CH_2$—, —$CH_2CHCHCH_2$—,

—$CH_2C_6H_4CH_2$—, —$C_6H_4$—, —$C_6H_4C_6H_4$—, —$C_6H_4OC_6H_4$, —$C_6H_4SC_6H_4$—, —$C_6H_4SO_2C_6H_4$—, —$C_{10}H_6$—,

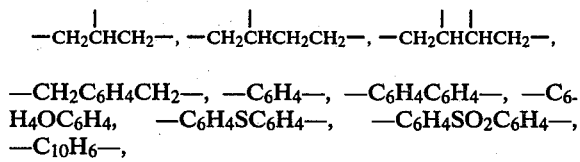

—$C_6H_{10}$—, —$CH_2C_6H_{10}$—, —$CH_2C_6H_{10}CH_2$—, etc.

The polymeric compounds comprising a recurring structural unit of —CH₂CH₂O— are literally polyethylene oxide. In order to increase the thermal stability of the polyethyleneoxide, the polymer is preferably end-capped by reacting the terminal hydroxyl groups with epoxy, isocyanate, or carboxylic acid compounds. There is no lower limit on the molecular weight of the polyethyleneoxide, except that there has to be at least 2 recurring units as specified above, and the molecular weight of the polyethyleneoxide or related compound can be as high as sixteen million.

The preparation of the complex can be achieved easily by codissolving both the ether compound, or polymer, and the alkali halide in a solvent, and then precipitating the complex by evaporating the solvent. For example, a certain amount of polyethyleneoxide is added first into about 20 times the amount of methanol, and then a few percent of LiX is added. Depending on the molecular weight of the polyethyleneoxide, the polymer may or may not be dissolved readily into the solvent even with rigorous stirring at 50° C. When the molecular weight is lower than 1,000, the dissolution of the polymer can easily be achieved. In most cases, the addition of LiX helps the dissolution of high molecular weight polyethyleneoxide (by the "salting-in" phenomenon), yielding a homogeneous solution.

When the moelcular weight of polyethyleneoxide polyethyleneglycol is higher than 600,000, the polymer is not soluble in methanol. The addition of a few percent (wt % based on polymer weight) of the LiX will immediately bring the polymer into solution and a clear, homogeneous solution will be obtained. The "salting-in" phenomenon is usually a good indication of the complex formation between the polymer and the LiX.

When the number of the repeating $CH_2CH_2O$ or ratio of n/LiX is equal to 2/1, a stable complex between the polyethyleneoxide and LiX is obtained. This complex has a melting temperature of at least 205° C., which is about 140° C. higher than that of the starting polyethyleneoxide, and a decomposition temperature higher than 260° C. It should be noted that the melting temperature of a complex depends also on the perfection, thermal history, etc., of the complex. When less than the 2/1 for the $CH_2CH_2O$/LiX ratio is being used, elastomeric type products or other eutectic crystalline compounds may result.

The compositions of this invention may be molded at temperatures ranging from about 25° C. to 200° C. Polybutyleneterephthalate compositions may be molded by allowing to stand in a mold at temperatures as low as 25° C. With polyethyleneterephthalate, molding temperatures of 90° C. or higher are desirable.

The molding compounds may also contain fiberglass as reinforcing agent. All glass fibers available commercially for resin reinforcement may be used. The average length should be at least 0.2 mm, though the fibers can be from about 0.2 to about 10 mm. When the average length is less than 0.2 mm and the proportion of finer glass fibers increases, the mechanical strength, especially impact strength, of molded articles prepared from the resulting composition is reduced extremely and the heat distortion temperature also decreases. The diameter of the glass fibers can be selected from about 8 to 20 microns on an average.

A suitable amount of the glass fiber is from about 5 to 200 parts by weight per 100 parts by weight of the polyethyleneterephthalate. If the amount of the glass fibers is smaller than the specified amount, the heat distortion temperature and surface hardness of a molded article prepared from the resulting resin composition is reduced. If the amount of fiber exceeds the specified amount, the resulting composition is difficult to mold.

The glass fiber may be surface treated with various coupling agents such as a silane compound, a titanate compound, an isocyanate compound or an epoxy compound, etc. to increase the adhesion between the matrix resin and the glass fiber. Other fibrous reinforcing materials such as carbon fiber, organic fillers may also be used. The plate-like reinforcing agents, such as mica and/or particulate fillers such as clay, wollastonite, calcium carbonate and the like, or combinations thereof, may also be employed. The amounts of these materials employed in making a molding compound varies from 5 to 60% by weight based on the total weight of the compound.

The glass fiber-reinforced thermoplastic polyester composition of this invention may further contain at least one additive selected from the group consisting of coloring agents, fire retardants, ultraviolet absorbers, anti-oxidants, lubricants, coloration inhibitors, fillers and antistatic agents.

To impart strength, color or particular surface properties, a variety of fillers may be added to the composition of this invention, including, but not by way of limitation: for strength: fiberglass, wollastonite, graphite, mica, organic fibers such as polyaromatic amide fibers; for lubrication: polytetrafluoroethylene, paraffin or sodium stearate. The examples which follow illustrate further types of additives which are suitable in the practice of this invention.

Examples of suitable coloring agents are dyes such as azo types and anthraquinone dyes, organic pigments such as azo pigments, phthalocyanine pigments and quinacridone pigments, and inorganic pigments such as titanium oxide, carbon black, red iron oxide and cadmium sulfide. The appropriate amount of coloring agent may be determined experimentally. For example, it is generally about 0.01 to about 5% by weight, preferably about 0.05 to about 2% by weight, based on the weight of polyalkyleneterephthalate.

Examples of suitable fire retardants include halogen-containing compounds such as brominated biphenyl ether, polycarbonate produced from ring-brominated products of bisphenol A, elemental phosphorus, phosphorus compounds such as triphenyl phosphate, and compounds having a phosphorus-nitrogen bond such as phosphoramide. The appropriate amount of the fire retardant may be determined experimentally. For example, it is generally about 0.5 to about 50% by weight, preferably about 3 to about 25% by weight, based on the weight of polyalkyleneterephthalate.

Examples of suitable ultraviolet absorbers include benzophenone compounds such as 2-hydroxy-4-methoxybenzophenone, benzotriazole compounds such as (2-hydroxy-5-methylphenyl) benzotriazole, and salicylate compounds such as phenyl salicylate. The appropriate amount of the ultraviolet absorber may be determined experimentally. For example, it is generally about 0.01 to about 2% by weight, preferably about 0.05 to about 1% by weight, based on the weight of the polyaklyeneterephthalate.

Examples of suitable antioxidants include hindered phenol compounds such as 2,4,6-tri-tert-butyl phenol, sulfur-containing compounds such as dilauryl thiodipropionate, and amine compounds such as phenyl-d-naphthylamine. The appropriate amount of the antioxidant may be determined experimentally. For example, it is generally about 0.01 to about 2% by weight, preferably about 0.05 to about 1% by weight, based on the weight of polyalkyleneterephthalate.

Examples of suitable lubricants include paraffin waxes such as liquid paraffin, fatty acids such as palmitic acid, fatty acid esters such as butyl stearate, and fatty acid metal salts such as sodium stearate and polytetrafluoro ethylene powder. The amount of lubricant may be determined experimentally. For example, it is generally about 0.01 to about 2% by weight, preferably about 0.05 to about 1% by weight, based on the weight of the polyester.

Examples of suitable antistatic agents include cationic surface active agents such as stearamidopropyl dimethyl-$\beta$-hydroxymethyl ammonium nitrate, anionic surface active agents such as alkylaryl sulfates, and nonionic surface active agents such as polyethylene oxide. The amount of the antistatic agent may be determined experimentally. For example, it is generally about 0.01 to about 5% by weight, preferably about 0.05 to about 2% by weight, based on the weight of the polyalkyleneterephthalate.

In order to improve the flow property of the thermoplastic molding compound, a selected plasticizer may also be added. The lowering of torque during extrusion due to the improvement of flow by the plasticizer has been known in the art of thermoplastic technology.

When a plasticizer is added in the practice of this invention, the amount ranges from about 0.5 to about 3% by weight percent (based on the weight of polyalkyleneterephthalate). The plasticizer may be an organic ester, or a polyether containing block copolymer repeating units. The organic ester may be an aliphatic or aromatic ester product of an aromatic or aliphatic carboxylic acid of 1 to 36 carbon and an alcohol of 7 to 20 carbon atoms. Commercially available plasticizers of this kind are, for instance, Benzoflex S312, a neopentylglycoldibenzoate; Benzoflex 9-88; a dipropylene glycol dibenzoate and Loxiol G30, a mono fatty acid ester, etc.

The polyether plasticizer containing block copolymer may be a reaction product of

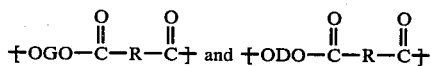

polymers, wherein G is a divalent radical remaining after removal of terminal hydroxy groups from poly-(alkylene oxide) glycol having a molecular weight of about 200 to 5,000, in which the alkylene group advantageously has 2–10, preferably 2–4 carbon atoms, R is a divalent radical, remaining after removal of carboxyl groups from a dicarboxylic acid, having a molecular weight in the range of about 96 to about 300, and D is a divalent radical, remaining after removal of hydroxyl groups from a low molecular weight diol, having a molecular weight of about 62 to 250.

The making of block copolyester ethers of this kind has been described in U.S. Pat. Nos. 3,663,653, 3,775,373 and 3,801,547. A commercially available copolymer of this kind is a thermoplastic elastomer sold by DuPont under the trademark "HYTREL".

Suitable polyalkyleneterephthalate compounds are prepared using the appropriate ingredients containing as little moisture as possible, preferably less than 0.01%. The desired ingredients are premixed, dried at temperatures ranging from 80° to 120° C. and then coextruded at temperatures ranging from 240° to 290° C., preferably from 260° to 270° C.

SPECIFIC EMBODIMENTS OF THE INVENTION

The invention is illustrated by the following examples which are intended merely for purpose of illustration and are not to be regarded as limiting the scope of the invention or the manner in which it may be practiced. Unless specifically indicated otherwise, parts and percentages are given by weight. The materials used for these experiments are as follows and are identified as indicated below:

L.O. is Loxiol G30, or a mono fatty acid ester, sold by Henkel, Inc., Hoboken, N.J.;

M.O. is Lubinol or a mineral heavy oil, sold by McKesson Laboratories, Bridgeport, Conn.;

Talc: as purchased from Cyprus Industrial Minerals Company, has an average size of about 4 microns;

BF is Benzoflex S312 or a plasticizer, sold by Velsicol Chemical Corporation. It is a neopentylglycoldibenzoate.

PEO is polyethyleneoxide as sold by Polyscience Corporation. It has a weight average molecular weight of 18,000.

Complex: a PEO/LiX complex prepared by using (2/1) of —CH$_2$CH$_2$O— repeating units to LiX molar ratio. A common solvent for the complex and PEO is methanol.

PET is the polyethyleneterephthalate used: Vituf 5900 or Cleartuf 7202, both sold by Goodyear Corporation. These have an intrinsic viscosity of 0.59 and 0.72, respectively, as measured in a solution mixture of phenol/tetrachloroethane (40/60 wt) at 25° C.

PBT is the polybutyleneterephthalate which has an intrinsic viscosity of about 0.85 as measured in o-chlorophenol solution at 25° C.

HT is Hytrel. The Hytrel 4056 used for this experiment is a block copolyether ester sold by DuPont which has a melt temperature of 168° C. and an apparent melt viscosity equal to 20,000 pascal seconds tested under a shear ratio of $10^{-1}$sec at 180° C.

Fiberglass: type 3540 sold by PPG Industries, Inc. The nominal fiber diameter is 0.00038 inch and the length is $\frac{1}{8}$ inch.

EXAMPLE I

A series of polyethyleneterephthalate compositions are prepared respectively by pre-drying all ingredients at 80°–90° C. in a vacuum for about 16 hours, except for the Benzoflex S312 which is not added until just before extrusion. Each of the compositions is co-extruded at 260°-250°-260° C. barrel temperatures, using a $\frac{1}{2}$ inch screw extruder operating at 60–70 rpm. The extrudates are pelletized and samples are taken for crystallization study. Each of the polyethyleneterephthalate (PET) compositions contains 30% fiberglass.

The crystallization temperature is studied using Perkin-Elmer DSC-2 equipment. The melt crystallization (Tmc) is taken by heating a pellet to 540° K. using a 40° C./min rate, holding at 540° K. for 1 minute, then cooling it at a 5° C./min rate in the DSC. The cold crystallization temperature (Tcc) is obtained by heating a quenched pellet at 20° C./min in the DSC. The amorphous PET compositions are prepared by heating the PET pellet to melting, keeping it at 270° C. for 2 minutes, then quickly quenching it into dry ice. The results of the study as well as the proportions of (% based on total weight) of Benzoflex S312 (BF) and polyethyleneoxide (PEO) are summarized in Table I.

In each case the PET has an intrinsic viscosity of 0.72; the PEO and BF are as described above, the PBT has an intrinsic viscosity of 0.85; and the complex is one made by using one mole of LiX for each two —$CH_2CH_2O$— repeating units of PEO which is a polyethyleneoxide having a weight average molecular weight of 18,000. The complex has a melting temperature of at least 205° C. and a decomposition temperature higher than 260° C.

TABLE I

| Effect of Crystallization Promoters | | | | | |
|---|---|---|---|---|---|
| Experiment # | Control | 1 | 2 | 3 | 4 |
| BF | 0 | 1.05 | 1.05 | 1.05 | 1.05 |
| PEO | 0 | 0.35 | 0.35 | 0.35 | 0.35 |
| Complex: | | | | | |
| PEO/LiCl | 0 | 0 | 0.35 | 0 | 0 |
| PEO/LiBr | 0 | 0 | 0 | 0.35 | 0 |
| PEO/LiI | 0 | 0 | 0 | 0 | 0.35 |
| Crystallization Temperatures (°K.) | | | | | |
| Tcc | 415 | 410 | 402 | 395 | 395 |
| Decrease* | — | — | −8 | −15 | −15 |
| Decrease** | — | — | −13 | −20 | −20 |
| Tmc | 486 | 490 | 496 | 498 | 496 |
| Increase* | — | — | +6 | +8 | +6 |
| Increase** | — | — | +10 | +12 | +10 |

*As compared to composition containing only BF and PEO (Exp. 1)
**As compared to control

EXAMPLE II

The procedure of Example I is repeated (with similar improved results) using in place of the polyethyleneterephthalate, a polybutyleneterephthalate (PBT) having an intrinsic viscosity of 0.85. The polybutyleneterephthalate (PBT) compositions are prepared by co-extruding the PBT with and without the crystallization promoter at temperatures of 250°–240°–250° C. The PBT compositions contain no fiberglass.

EXAMPLE III

The procedure of Example I is repeated with similar improved results using in place of the polyethylene oxide of that example other polyethylene oxides having molecular weights of 500; 100,000; 1,000,000 and 16,000,000, using in each case LiK in a ratio such that there are approximately 2 repeating units of —$CH_2CH_2O$— per molecule of LiK. Similar results are obtained when the above procedures are repeated in which the terminal hydroxy groups of the polyethylene oxide have been esterified by reaction with acetyl chloride.

Reference has been made above regarding the use of block copolymers of the polyalkyleneterephthalate in which case the block copolymers contain at least 30 percent, preferably at least 50 percent by weight, of the polyalkyleneterephthalate. In such cases the other block or blocks may comprise other ester condensation polymers such as ethylene furmarate, maleate, etc., or may even comprise addition polymers such as polyethylene, polypropylene, polybutadiene, etc., in which there have been attached hydroxy or carboxylic acid groups for attachment to the polyalkyleneterephthalate block or blocks.

Moreover the polyalkyleneterephthalate may be blended with other polymers compatible with the polyalkyleneterephthalate. In such cases however, it is generally preferable to add no more than about 10 percent by weight of such compatible polymers.

While certain features of this invention have been described in detail with respect to various embodiments thereof, it will of course be apparent that other modifications can be made within the spirit and scope of this invention, and it is not intended to limit the invention to the exact details insofar as they are defined in the following claims.

The invention claimed is:

1. A fast crystallizing molding composition comprising essentially:
   a. a polyalkyleneterephthalate in which the alkylene group has 2–4 carbon atoms;
   b. a complex of LiX and a polymeric compound having at least two recurring units having the formula —$CH_2CH_2O$—, the amount of said complex being enough to give a proportion of 0.05–4 percent by weight of LiX based on the weight of said polyalkyleneterephthalate, wherein X is Br, Cl or I.

2. The composition of claim 1, in which there is 5–60 percent by weight of at least one modifier selected from the class consisting of reinforcing and filling materials, said weight percentage being based on the total weight of the composition.

3. The composition of claim 2, wherein component (a) is polyethyleneterephthalate having an intrinsic viscosity of at least 0.4 dl/g as measured on a 2:3 by weight mixture respectively of phenol and tetrachloroethane at 25° C.

4. The composition of claim 2, wherein component (a) is polybutyleneterephthalate having an intrinsic viscosity of at least 0.5 as measured on an o-chlorophenol solution at 25° C.

5. The composition of claim 2, wherein in component (a) the polyalkyleneterephthalate is a block copolymer containing at least 30% by weight of the polyalkyleneterephthalate recurring units.

6. The composition of claim 2, wherein component (a) is a block copolymer at least 30% polyethyleneterephthalate.

7. The composition of claim 2, wherein component (a) is a block copolymer having at least 50% polybutyleneterephthalate.

8. The composition of any one of the claims 1 or 2, wherein the polymeric compound of component (b) has an average molecular weight from about 200 to 16,000,000.

9. The composition of any of claims 1 to 3, wherein the polymeric compound of component (b) has at least 20 of said recurring units.

10. The composition of any one of claims 1 to 3 wherein the amount of said LiX complex is sufficient to give 0.1–2 percent by weight of LiX based on the weight of said polyalkyleneterephthalate.

11. The composition of any of claims 1 or 3, wherein there is 0.5 to 60 percent by weight of a reinforcing material selected from the group consisting of glass fibers, glass beads, graphite, carbon fibers, mica, wollastonite and polyaromatic amide fibers.

12. The composition of any one of claims 1 or 3, wherein there is 0.5 to 60 percent by weight of a modifier selected from the group consisting of paraffin and polytetraflouroethylene.

13. The composition of any one of claims 1 or 3, wherein there is 0.5 to 3 percent by weight of a plasticizer selected from the group consisting of a block copolyester ether, dibenzoate of neopentyl glycol, dibenzoate of dipropylene glycol and a monoester of a fatty acid containing 0 to 32 carbon atoms.

14. The composition of any of claims 1 or 3, wherein said LiX is LiBr and the amount of said LiBr complex is sufficient to give 0.1–2 percent by weight of LiBr based on the weight of said polyalkyleneterephthalate.

15. The product obtained by molding at a mold temperature of 25° to 200° C. a composition as claimed in any one of claims 1 to 7.

16. The product obtained by molding a composition as claimed in any one of claims 3 and 6 at a mold temperature of 90° to 200° C.

* * * * *

UNITED STATES PATENT AND TRADEMARK OFFICE
CERTIFICATE OF CORRECTION

PATENT NO. : 4,438,233
DATED : March 20, 1984
INVENTOR(S) : Chung J. Lee

It is certified that error appears in the above-identified patent and that said Letters Patent is hereby corrected as shown below:

Col. 2, line 62, correct "hwving" to read "having".

Col. 5, line 27, correct "moelcular" to read "molecular".

Col. 10, line 40, after "copolymer" insert "having".

Col. 11, line 2, correct "0 to 32" to read "1 to 36".

Signed and Sealed this

Twelfth Day of June 1984

[SEAL]

Attest:

GERALD J. MOSSINGHOFF

Attesting Officer    Commissioner of Patents and Trademarks